United States Patent
Galvan et al.

(10) Patent No.: US 11,905,400 B2
(45) Date of Patent: Feb. 20, 2024

(54) PIPES AND POLYPROPYLENE COMPOSITION FOR THE MANUFACTURE THEREOF

(71) Applicant: BASELL POLIOLEFINE ITALIA S.R.L., Milan (IT)

(72) Inventors: Monica Galvan, Ferrara (IT); Claudio Cavalieri, Ferrara (IT); Thomas Boehm, Darmstadt (DE); Roberto Pantaleoni, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 298 days.

(21) Appl. No.: 17/282,294

(22) PCT Filed: Sep. 11, 2019

(86) PCT No.: PCT/EP2019/074172
§ 371 (c)(1),
(2) Date: Apr. 1, 2021

(87) PCT Pub. No.: WO2020/069828
PCT Pub. Date: Apr. 9, 2020

(65) Prior Publication Data
US 2021/0340367 A1  Nov. 4, 2021

(30) Foreign Application Priority Data
Oct. 3, 2018  (EP) ..................... 18198385

(51) Int. Cl.
*C08L 23/14* (2006.01)
*F16L 9/12* (2006.01)

(52) U.S. Cl.
CPC ............... *C08L 23/14* (2013.01); *F16L 9/12* (2013.01); *C08L 2203/18* (2013.01); *C08L 2205/025* (2013.01)

(58) Field of Classification Search
CPC . C08L 23/14; C08L 2205/02; C08L 2205/025
See application file for complete search history.

(56) References Cited

U.S. PATENT DOCUMENTS

| | | | |
|---|---|---|---|
| 4,399,054 A | 8/1983 | Ferraris et al. | |
| 5,296,548 A * | 3/1994 | Covezzi | C08F 297/08 525/240 |
| 5,538,804 A * | 7/1996 | Ogale | B32B 15/20 525/216 |
| 2016/0280899 A1* | 9/2016 | Töltsch | C08L 23/12 |

FOREIGN PATENT DOCUMENTS

| | | | | |
|---|---|---|---|---|
| EP | 045977 | A2 | 2/1982 | |
| EP | 361493 | A1 | 4/1990 | |
| EP | 395083 | A2 | 10/1990 | |
| EP | 728769 | A1 | 8/1996 | |
| EP | 782587 | A1 | 7/1997 | |
| EP | 3064548 | A1 * | 9/2016 | ......... B29C 47/0004 |
| WO | 0063261 | A1 | 10/2000 | |
| WO | 03037981 | A1 | 5/2003 | |
| WO | 2005040271 | A1 | 5/2005 | |
| WO | 2007011530 | A2 | 1/2007 | |
| WO | 2011160945 | A1 | 12/2011 | |
| WO | 2013083617 | A1 | 6/2013 | |
| WO | 2015022127 | A1 | 2/2015 | |
| WO | 2018065242 | A1 | 4/2018 | |

OTHER PUBLICATIONS

International Search Report and Written Opinion dated Oct. 16, 2019 (Oct. 16, 2019) for Corresponding PCT/EP2019/074172.
Galland et al.; Study of Ethylene-Propylene-1-Hexene Co- and Terpolymers Obtained with Homogeneous and Supported Metallocene Catalysts, Macromol. Symp. 2006, 245-246, pp. 42-50, DOI:10.1002/masy.200651307.
Gahleitner et al.; Heterophasic Copolymers of Polypropylene: Development, Design Principles, and Future Challenges, Journal of Applied Polymer Science, Jun. 28, 2013, pp. 3028-3037, DOI:10.1002/app.39626.
Gahleitner et al.; Post-Crystallization and Physical Aging of Polypropylene: Material and Processing Effects, Journal of Macromolecular Science, Part B-Physics, vol. B41, Nos. 4-6, pp. 833-849, 2002, DOI:10.1081/MB-120013068.

* cited by examiner

*Primary Examiner* — Irina S Zemel
*Assistant Examiner* — Jeffrey S Lenihan

(57) ABSTRACT

A polypropylene composition made from or containing:
 A) from 88.0 wt. % to 98.0 wt. %, of a random copolymer of propylene containing from 0.8 wt. % to 4.8 wt. % of 1-hexene derived units; the random copolymer of propylene having:
  a Melt Flow Rate: measured according to ISO 1133 (230° C., 5 Kg) ranging from 0.5 to 4.4 g/10 min; and
 B) from 2.0 wt. % to 12.0 wt. % of a terpolymer of propylene ethylene and 1-hexene having a content of ethylene derived units ranging from 35 wt. % to 60 wt.; and a content of 1-hexene derived units ranging from 1 wt. % to 6 wt. %;
wherein the polypropylene composition has a Melt Flow Rate: measured according to ISO 1133 (230° C., 5 Kg) ranging from 0.5 to 5.0 g/10 min.

9 Claims, No Drawings

PIPES AND POLYPROPYLENE COMPOSITION FOR THE MANUFACTURE THEREOF

This application is the U.S. National Phase of PCT International Application PCT/EP2019/074172, filed Sep. 11, 2019, claiming benefit of priority to European Patent Application No. 18198385.9, filed Oct. 3, 2018, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to polypropylene based composition containing 1-hexene derived units and pipes made therefrom.

BACKGROUND OF THE INVENTION

In some instances, polymer materials are used for manufacturing pipes. In some instances, the pipes are used for fluid transport, wherein the fluid may be pressurized or not.

In pressurized pipes, the transported fluid may have varying temperatures. In some instances, the temperatures are within the range of about 0° C. to about 70° C. In some instances, the pipes are made of polyolefins, including polyethylene and polypropylene.

Because polyolefinic pipes are at risk of damage during handling, Charpy impact strength is a consideration.

SUMMARY OF INVENTION

In a general embodiment, the present disclosure provides a polypropylene composition made from or containing:

A) from 88.0 wt. % to 98.0 wt. % of a random copolymer of propylene containing from 0.8 wt. % to 4.8 wt. % of 1-hexene derived units, based upon the total weight of the random copolymer of propylene; the random copolymer of propylene having:
   a Melt Flow Rate: measured according to ISO 1133 (230° C., 5 Kg) ranging from 0.5 to 4.4 g/10 min; and
B) from 2.0 wt. % to 12.0 wt. % of a terpolymer of propylene, ethylene and 1-hexene having a content of ethylene derived units ranging from 35 wt. % to 60 wt. %, based upon the total weight of the terpolymer; and a content of 1-hexene derived units ranging from 1 wt. % to 6 wt. %, based upon the total weight of the terpolymer;
wherein the polypropylene composition has a Melt Flow Rate: measured according to ISO 1133 (230° C., 5 Kg) ranging from 0.5 to 5.0 g/10 min;
the sum of the amounts of A) and B) being 100.

DETAILED DESCRIPTION OF THE INVENTION

In some embodiments, the present disclosure provides a polypropylene composition made from or containing:
A) from 88.0 wt. % to 98.0 wt. %, alternatively from 90.5 wt. % to 96.5 wt. %, of a random copolymer of propylene containing from 0.8 wt. % to 4.8 wt. %, alternatively from 1.4 wt. % to 4.1 wt. %, alternatively from 1.8 wt. % to 3.6 wt. %; alternatively from 1.9 wt. % to 2.9 wt. % of 1-hexene derived units, based upon the total weight of the random copolymer of propylene; the random copolymer of propylene having:
   a Melt Flow Rate: measured according to ISO 1133 (230° C., 5 Kg) ranging from 0.5 to 4.4 g/10 min; alternatively from 1.0 to 3.7 g/10 min; alternatively from 1.2 to 2.3 g/10 min; and
B) from 2.0 wt. % to 12.0 wt. %, alternatively from 3.5 wt. % to 9.5 wt. %, of a terpolymer of propylene, ethylene and 1-hexene having a content of ethylene derived units ranging from 35 wt. % to 60 wt. %; alternatively ranging from 42 wt. % to 54 wt. %; alternatively from 46 wt. % to 52 wt. %, based upon the total weight of the terpolymer; and a content of 1-hexene derived units ranging from 1 wt. % to 6 wt. %; alternatively ranging from 2 wt. % to 5 wt. %; alternatively from 2.5 wt. % to 4 wt. %, based upon the total weight of the terpolymer;
wherein the polypropylene composition has a Melt Flow Rate: measured according to ISO 1133 (230° C., 5 Kg) ranging from 0.5 to 5.0 g/10 min; alternatively from 1.3 to 3.0 g/10 min;
the sum of the amounts of A) and B) being 100.

In some embodiments, the polypropylene composition has a tensile modulus higher than 900 MPa; alternatively higher than 1000 MPa; alternatively higher than 1100 MPa.

In some embodiments, the polypropylene composition has a Charpy impact value measured at 23° C. after 7 days of annealing higher than 80 KJ/m$^2$; alternatively higher than 90 KJ/m$^2$.

In some embodiments, the polypropylene has a Charpy impact value measured at 0° C. after 7 days of annealing higher than 5 KJ/m$^2$; alternatively higher than 6.5 KJ/m$^2$.

As used herein, the term "copolymer" refers to polymers prepared by the polymerization of two different types of monomers. As used herein, the term "terpolymer" refers to polymers prepared by the polymerization of three different types of monomers.

In some embodiments, the polypropylene composition is used for the preparation of pipes, alternatively pressure pipes.

In some embodiments, the present disclosure provides a pipe made from or containing the polypropylene composition.

As used herein, the term "pipe" includes pipe fittings, valves and other parts. In some embodiments, the pipe elements are used in a hot water piping system. As used herein, the term "pipe" further includes single and multilayer pipes. In some embodiments, the multilayer pipes are pipes wherein one or more of the layers is a metal layer. In some embodiments, the multilayer pipes include an adhesive layer.

In some embodiments, the polypropylene composition is further made from or containing an inorganic filler agent in an amount ranging from 0.5 to 60 parts by weight with respect to 100 parts by weight of the polypropylene composition. In some embodiments, the filler agents are selected from the group consisting of calcium carbonate, barium sulphate, titanium bioxide and talc. In some embodiments, the filler agents are selected from the group consisting of talc and calcium carbonate. In some embodiments, the filler agents have a nucleating effect. In some embodiments, the nucleating agent is talc. In some embodiments, the amount of a nucleating agent is from 0.5 to 5 wt. % with respect to the polymer amount.

In some embodiments, the polypropylene composition is used to prepare polypropylene pipes with walls of a configuration other than with smooth inner and outer surfaces. In some embodiments, the pipes are selected from the group consisting of pipes with a sandwich-like pipe wall, pipes with a hollow wall construction with longitudinally extending cavities, pipes with a hollow wall construction with spiral cavities, pipes with a smooth inner surface and a compact or hollow, spirally shaped, or an annularly ribbed outer surface, independently of the configuration of the respective pipe ends.

In some embodiments, the process for preparing the polypropylene composition is carried out by a sequential polymerization including at least two sequential steps, wherein components A) and B) are prepared in separate subsequent steps, operating in each step, except the first step, in the presence of the polymer formed and the catalyst used in the preceding step. In some embodiments, the catalyst is added in the first step and not in subsequent steps. In some embodiments, the catalyst remains active for the subsequent steps. In some embodiments, component A) is prepared before component B).

In some embodiments, the polymerization occurs in liquid phase, gas phase or liquid-gas phase.

In some embodiments, the propylene polymerization stage is carried out using liquid propylene as diluent, and the following copolymerization stage in gas phase, without intermediate stages except for the partial degassing of the propylene.

In some embodiments, the reactors are selected from the group consisting of continuously operated stirred reactors, loop reactors, fluidized-bed reactors or horizontally or vertically stirred powder bed reactors. In some embodiments, the reaction is carried out in a plurality of reactors connected in series.

In some embodiments, the polymerization is carried out in a cascade of stirred gas-phase reactors that are connected in series and wherein the pulverulent reaction bed is kept in motion by a vertical stirrer. In some embodiments, the reaction bed is made from or contains the polymer that is polymerized in the reactor.

In some embodiments, the temperature for polymerization is from 20 to 150° C., alternatively from 50 to 100° C. In some embodiments, the pressure for polymerization is atmospheric or higher.

In some embodiments, the molecular weight is regulated. In some embodiments, the molecular weight regulator is hydrogen.

In some embodiments, the polypropylene compositions are prepared by a sequential polymerization process including the preparation of component A) in a first step with gas-phase polymerization apparatus having two interconnected polymerization zones and a second step wherein the terpolymer of propylene, ethylene, and 1-hexene is prepared by polymerizing the monomers in a separate fluidized bed reactor.

In some embodiments, a gas-phase polymerization apparatus for performing the first step of the process is described in European Patent Application No. EP-A1-782587.

In some embodiments, the process includes feeding one or more monomer(s) to the polymerization zones in the presence of catalyst under reaction conditions and collecting the polymer product from the polymerization zones. In the process, the growing polymer particles flow upward through a first polymerization zone (riser) under fast fluidization conditions, leave the riser and enter a second polymerization zone (downcomer) through which the growing polymer particles flow downward in a densified form under the action of gravity, leave the downcomer and are reintroduced into the riser, thereby establishing a circulation of polymer between the riser and the downcomer.

In the downcomer, the polymer particles flow under the action of gravity in a densified form, thereby achieving the high values of density of the solid and approaching the bulk density of the polymer. In some embodiments, a positive gain in pressure is obtained along the direction of flow, thereby permitting reintroduction of the polymer into the riser without mechanical assistance. In this way, a "loop" circulation is set up, which is defined by the balance of pressures between the two polymerization zones and by the head loss introduced into the system.

In some embodiments, the condition of fast fluidization in the riser is established by feeding a gas mixture made from or containing the relevant monomers to the riser. In some embodiments, the feeding of the gas mixture is effected below the point of reintroduction of the polymer into the riser by a gas distributor. In some embodiments, the velocity of transport gas into the riser is higher than the transport velocity under the operating conditions, alternatively from 0.8 to 15 m/s.

In some embodiments, the polymer and the gaseous mixture leaving the riser are conveyed to a solid/gas separation zone for separation. From the separation zone, the polymer enters the downcomer. The gaseous mixture leaving the separation zone is compressed, cooled and transferred to the riser. In some embodiments, the gaseous mixture is supplemented with make-up monomers and/or molecular weight regulators, In some embodiments, the transfer occurs via a recycle line for the gaseous mixture.

In some embodiments, the control of the polymer circulating between the two polymerization zones occurs by metering the amount of polymer leaving the downcomer through controlling the flow of solids. In some embodiments the control of flow is achieved with mechanical valves.

In some embodiments, the operating temperature is between 50 and 120° C.

In some embodiments, the operating pressure is between 0.5 and 10 MPa, alternatively between 1.5 to 6 MPa.

In some embodiments, at least one inert gas is maintained in quantities in the polymerization zones such that the sum of the partial pressures of the inert gases is between 5 and 80% of the total pressure of the gas. In some embodiments, the inert gas is nitrogen or propane.

In some embodiments, the polymer leaving the first polymerization apparatus is discharged from the downcomer to a gas-solid separator then collected and transferred to the second stage. In some embodiments, the second stage is carried out in a fluidized-bed gas-phase reactor.

In some embodiments, the catalyst components are fed to the riser at any point of the riser. In some embodiments, the catalyst components are fed at any point of the downcomer. In some embodiments, the catalyst is in any physical state. In some embodiments, the catalysts are in either solid or liquid state.

In some embodiments, the catalysts are Ziegler-Natta catalysts made from or containing a solid catalyst component including a titanium compound having at least one titanium-halogen bond, and an electron-donor compound, with both compounds supported. In some embodiments, the support is a magnesium halide in active form. In some embodiments, silica is a co-support.

In some embodiments, the solid catalyst components used in the catalysts are as described in U.S. Pat. No. 4,399,054, European Patent Application No. EP-A2-045977 or European Patent Application No. EP-A2-395083.

In some embodiments, the solid catalyst components are made from or contain, as electron-donor compounds (internal electron-donor compounds), compounds selected from the group consisting of ethers, ketones, lactones, compounds containing N, P and/or S atoms, and esters of mono- and dicarboxylic acids. In some embodiments, the electron-donor compounds are selected from the group consisting of phthalic acid esters and esters of succinic acids. In some embodiments, the phthalic acid esters are selected from the group consisting of diisobutyl, dioctyl, diphenyl and benzylbutyl phthalate.

In some embodiments, the internal electron donor compounds are selected from succinates described in Patent Cooperation Treaty Publication No. WO-A1-00/63261.

In some embodiments, the electron-donors are 1,3-diethers as described in European Patent Application Nos. EP-A1-361493 and EP-A1-728769.

In some embodiments, a MgCl2.nROH adduct wherein n is from 1 to 3 and ROH is ethanol, butanol or isobutanol, is reacted with an excess of $TiCl_4$ containing the electron-donor compound. In some embodiments, the MgCl2.nROH adduct is in the form of spherical particles. In some embodiments, the reaction temperature is from 80 to 120° C. The solid is then isolated and reacted once more with $TiCl_4$, in the presence or absence of the electron-donor compound. Next, the solid is separated and washed with aliquots of a hydrocarbon until the chlorine ions are removed. In some embodiments and in the solid catalyst component, the titanium compound, expressed as Ti, is present in an amount from 0.5 to 10% by weight. In some embodiments, the quantity of electron-donor compound which remains fixed on the solid catalyst component is 5 to 20% by moles with respect to the magnesium dihalide. In some embodiments, the titanium compounds are the halides and the halogen alcoholates of titanium. In some embodiments, the titanium compound is titanium tetrachloride.

The reactions result in the formation of a magnesium halide in active form. In some embodiments, other reactions are used to cause the formation of magnesium halide in active form, starting from magnesium compounds other than halides. In some embodiments, the starting magnesium compounds are magnesium carboxylates.

The Ziegler-Natta catalysts also are made from or contain a co-catalyst. In some embodiments, the co-catalyst is an organoaluminum compound. In some embodiments, the organoaluminum compound is as an aluminum alkyl compound. An external donor is optionally added to the organoaluminium compound.

In some embodiments, the Al-alkyl compounds used as co-catalysts are selected from the group consisting of Al-trialkyls and linear or cyclic Al-alkyl compounds containing two or more Al atoms bonded by O or N atoms, or $SO_4$ or $SO_3$ groups. In some embodiments, the Al-trialkyls are selected from the group consisting of Al-triethyl, Al-triisobutyl, and Al-tributyl.

In some embodiments, the Al-alkyl compound is used in a quantity such that the Al/Ti ratio is from 1 to 1000.

In some embodiments, the electron-donor compounds are used as external donors and selected from the group consisting of aromatic acid esters and silicon compounds containing at least one Si—OR bond, where R is a hydrocarbon radical. In some embodiments, the aromatic acid esters are alkyl benzoates. In some embodiments, the silicon compounds are selected from the group consisting of (tert-butyl)$_2$Si(OCH$_3$)$_2$, (cyclopentyl)$_2$Si(OCH$_3$)$_2$, (cyclohexyl) (methyl)Si(OCH$_3$)$_2$ and (phenyl)$_2$Si(OCH$_3$)$_2$.

In some embodiments, the electron-donor compounds are 1,3-diethers as previously-described.

In some embodiments, the internal donor is 1,3-diether and the external donors are omitted.

In some embodiments and prior to the polymerization process, the catalysts are precontacted with small quantities of olefins (prepolymerization). It is believed that the prepolymerization improves the performance of the catalysts and the morphology of the polymers. While the catalysts are suspended in a hydrocarbon solvent, prepolymerization is carried out at a temperature from ambient to 60° C. for a time sufficient to produce quantities of polymer from 0.5 to 3 times the weight of the solid catalyst component. In some embodiments, the hydrocarbon solvent is hexane or heptane. In some embodiments, prepolymerization is carried out in liquid propylene to produce quantities of polymer up to 1000 g per g of catalyst component.

In some embodiments, articles, pressure pipes and related fittings are produced by extrusion, coextrusion, or molding.

In some embodiments, the articles are made with different type of extruders for polypropylene. In some embodiments, the extruders are single or twin screw extruders.

The following examples are given to illustrate but not limit the present disclosure.

EXAMPLES

The following analytical methods were used to characterize the polymer compositions and the pipes obtained therefrom.

Melt Flow Rate: measured according to ISO 1133 (230° C., 5 Kg).

[η] intrinsic viscosity: Determined in tetrahydronaphthalene at 135° C.

Xylene-soluble fraction (XS) at 25° C.:

Xylene Solubles at 25° C. were determined according to ISO 16152: 2005; with solution volume of 250 ml, precipitation at 25° C. for 20 minutes, including 10 minutes of which with the solution in agitation (magnetic stirrer), and drying at 70° C. The Fraction of xylene solubles of component b) was calculated according to the formula $XS_{tot}=Xs_A W_A + Xs_B W_B$;

wherein $XS_{tot}$ was the soluble xylene fraction of the overall composition $Xs_A$ was the soluble xylene fraction of component A and $W_A$ was the amount of component A; $Xs_B$ was the soluble xylene fraction of component B and $W_B$ was the amount of component B; wherein $W_A + W_B = 1$.

Charpy Impact Test

Charpy impact was measured according to ISO 179-1eA 2010, e ISO 1873-2 2007 at the given temperature. The sample was annealed at a temperature 23° C. for 7 days.

Tensile Modulus

Tensile Modulus was measured according to ISO 527-2 2012, and ISO 1873-2 2007 on injection-molded sample.

Melting Temperature (ISO 11357-3)

Determined by differential scanning calorimetry (DSC). A sample weighing 6±1 mg, was heated to 200±1° C. at a rate of 20° C./min and kept at 200±1° C. for 2 minutes in nitrogen stream. Thereafter, the sample was cooled at a rate of 20° C./min to 40±2° C. The sample was maintained at this temperature for 2 min, thereby permitting the sample to crystalize. Then, the sample was again fused at a temperature rise rate of 20° C./min up to 200° C.±1. The melting scan was recorded. A thermogram was obtained (° C. vs. mW). The temperatures corresponding to peaks were read. The temperature corresponding to the most intense melting peak recorded during the second fusion was taken as the melting temperature.

Creep Test

Specimens for creep tests were cut from injection-molded plaques (250×150×3.15 mm). Specimens were cut transversal to the direction of the injection flow. Shape of specimen was chosen same as profile of the ISO R527 type 1B tensile bars, and thickness was kept the same as the plaques from which specimens were cut.

Specimens were fixed vertically at a first end in a support inside a conditioning oven. A weight was put at the opposite, second end of the specimens, thereby generating stress on the specimens. The conditioning oven maintained the temperature at a specified value. Elongation and failure time were recorded.

Determination of 1-Hexene Content by NMR $^{13}$C NMR spectra were acquired on an AV-600 spectrometer operating at 150.91 MHz in the Fourier transform mode at 120° C. The peak of the propylene CH was used as internal reference at 28.83. The $^{13}$C NMR spectrum was acquired using the following parameters:

| | |
|---|---|
| Spectral width (SW) | 60 ppm |
| Spectrum centre (O1) | 30 ppm |
| Decoupling sequence | WALTZ 65_64pl |
| Pulse program | ZGPG |
| Pulse Length (P1) | for 90° |
| Total number of points (TD) | 32K |
| Relaxation Delay | 15 s |
| Number of transients | 1500 |

The total amount of 1-hexene as molar percent was calculated from identified diad present in the measured NMR using the following relations:

$[P]=PP+0.5PH$ $[H]=HH+0.5PH$

Assignments of the $^{13}$C NMR spectrum of propylene/1-hexene copolymers were calculated according to the following table:

| Area | Chemical Shift | Assignments | Sequence |
|---|---|---|---|
| 1 | 46.93-46.00 | $S_{\alpha\alpha}$ | PP |
| 2 | 44.50-43.82 | $S_{\alpha\alpha}$ | PH |
| 3 | 41.34-4.23 | $S_{\alpha\alpha}$ | HH |
| 4 | 38.00-37.40 | $S_{\alpha\gamma} + S_{\alpha\delta}$ | PE |
| 5 | 35.70-35.0 | $4B_4$ | H |
| 6 | 35.00-34.53 | $S_{\alpha\gamma} + S_{\alpha\delta}$ | HE |
| 7 | 33.75 33.20 | CH | H |
| 8 | 33.24 | $T_{\delta\delta}$ | EPE |
| 9 | 30.92 | $T_{\beta\delta}$ | PPE |
| 10 | 30.76 | $S_{\gamma\gamma}$ | XEEX |
| 11 | 30.35 | $S_{\gamma\delta}$ | XEEE |
| 12 | 29.95 | $S_{\delta\delta}$ | EEE |
| 13 | 29.35 | $3B_4$ | H |
| 14 | 28.94-28.38 | CH | P |
| 15 | 27.43-27.27 | $S_{\beta\delta}$ | XEE |
| 16 | 24.67-24.53 | $S_{\beta\beta}$ | XEX |
| 17 | 23.44-23.35 | $2B_4$ | H |
| 18 | 21.80-19.90 | $CH_3$ | P |
| 19 | 14.22 | $CH_3$ | H |

Determination of Ethylene and 1-Hexene Content by NMR $^{13}$C NMR spectra were acquired on an AV-600 spectrometer operating at 150.91 MHz in the Fourier transform mode at 120° C. The peak of the propylene CH was used as internal reference at 28.83. The $^{13}$C NMR spectrum was acquired using the following parameters:

| | |
|---|---|
| Spectral width (SW) | 60 ppm |
| Spectrum centre (O1) | 30 ppm |
| Decoupling sequence | WALTZ 16 |
| Pulse program | ZGPG |
| Pulse Length (P1) | for 90° |
| Total number of points (TD) | 32K |
| Relaxation Delay | 15 s |
| Number of transients | 1500 |

Diad distribution was calculated according to the following relations:

PP=100 I1/Σ

PH=100 I2/Σ

HH=100 I3/Σ

PE=100 I4/Σ

EE=100 (0.5(I12+I15)+0.25 I11)/Σ

Where Σ=I1+I2+I3+I4+0.5(I12+I15)+0.25 I11

The total amount of 1-hexene and ethylene as molar percent was calculated from diad using the following relations:

$[P]=PP+0.5PH+0.5PE$ $[H]=HH+0.5PH$ $[E]=EE+0.5PE$

Assignments of the $^{13}$C NMR Spectrum of Propylene/1-Hexene/Ethylene Copolymers

| Area | Chemical Shift | Assignments | Sequence |
|---|---|---|---|
| 1 | 46.93-46.00 | $S_{\alpha\alpha}$ | PP |
| 2 | 44.17-43.82 | $S_{\alpha\alpha}$ | PH |
| 3 | 41.30 | $S_{\alpha\alpha}$ | HH |
| 4 | 38.00-37.40 | $S_{\alpha\gamma} + S_{\alpha\delta}$ | PE |
| 5 | 35.70 | $4B_4$ | H |
| 6 | 35.00-34.53 | $S_{\alpha\gamma} + S_{\alpha\delta}$ | HE |
| 7 | 33.75 | CH | H |
| 8 | 33.24 | $T_{\delta\delta}$ | EPE |
| 9 | 30.92 | $T_{\beta\delta}$ | PPE |
| 10 | 30.76 | $S_{\gamma\gamma}$ | XEEX |
| 11 | 30.35 | $S_{\gamma\delta}$ | XEEE |
| 12 | 29.95 | $S_{\delta\delta}$ | EEE |
| 13 | 29.35 | $3B_4$ | H |
| 14 | 28.94-28.38 | CH | P |
| 15 | 27.43-27.27 | $S_{\beta\delta}$ | XEE |
| 16 | 24.67-24.53 | $S_{\beta\beta}$ | XEX |
| 17 | 23.36 | $2B_4$ | H |
| 18 | 21.80-19.90 | $CH_3$ | P |
| 19 | 14.22 | $CH_3$ | H |

The amount of 1-hexene and ethylene in component B was calculated by using the equations:

$C_{6tot}=C_{6A}*A+C_{6B}*B$ $C_{2tot}=C_{2B}*B$ wherein $C_{6tot}$ was the amount of 1-hexene in the composition; $C_{6A}$ was the amount of 1-hexene in component A); $C_{6B}$ was the amount of 1-hexene in component B); $C_{2tot}$ was the amount of ethylene in the composition; $C_{2B}$ was the amount of ethylene in component B); and A and B were the amount of components A and B.

Example 1 and Comparative Example 2

Preparation of the Solid Catalyst Component

Into a 500 mL four-necked round flask, purged with nitrogen, 250 mL of $TiCl_4$ were introduced at 0° C. While stirring, 10.0 g of microspheroidal $MgCl_2 \cdot C_2H_5OH$ having average particle size of 40 μm (prepared in accordance with the method described in example 1 of European Patent No. EP728769) and containing about 50% of EtOH, an amount of diethyl 2,3-diisopropylsuccinate in racemic form, to provide a Mg/succinate molar ratio of 12, was added. The temperature was raised to 100° C. and kept at this value for 60 min. The stirring was stopped. The liquid was siphoned off. The treatment with $TiCl_4$ was repeated at 110° C. for 30 min. After siphoning, fresh $TiCl_4$ and an amount of 9,9-bis(methoxymethyl)fluorene, to provide a Mg/diether molar ratio of 24, were added. The temperature was raised to 90° C. for 30 min. After sedimentation and siphoning at 85° C., the solid was washed six times with anhydrous hexane (6×100 ml) at 60° C.

Polymerization

The catalyst system was formed by the catalyst component, triethylaluminium (TEAL) as co-catalyst, and dicyclopentyldimethoxysilane as external donor, with the weight ratios indicated in the following tables.

The propylene polymer compositions were prepared in a two-step polymerization process, wherein the random copolymer A) was prepared in the first polymerization step by feeding the monomers and the catalyst system into a gas-phase polymerization reactor having two interconnected polymerization zones, a riser and a downcomer, as described in the European Patent Application No. EP-A1-782587. The polymerization mixture was discharged from the reactor and conveyed to a gas-solid separator. The polymerized material was sent into a gas-phase fluidized-bed reactor where the polymer of ethylene B) was produced. The operative conditions are indicated in Table 1.

The polymer particles exiting from the second polymerization step were subjected to a steam treatment to remove the unreacted monomers and dried. The characteristics of the polymer are reported in Table 2.

TABLE 1

|  |  | Ex 1 | Comp ex 2 |
| --- | --- | --- | --- |
| TEAL/external donor | wt/wt | 7.5 | 6 |
| TEAL/catalyst | wt/wt | 6 | 5 |
| Temperature | ° C. | 83 | 80 |
| Pressure | Bar-g | 23 | 25 |
| Split holdup riser downcomer | wt. % | 40 / 60 | 30 / 70 |
| H2/C3 riser | mol/mol | 0.003 | 0.003 |
| C6/(C6 + C3) | mol/mol | 0.021 | 0.26 |
| MFR @ 5 kg | g/10 min | 1.5 | 1.0 |
| C6 total content | wt. % | 2.2 | 1.6 |
| XS | wt. % | 1.6 | 2.3 |
| Tm | ° C. | 150.4 |  |
| Component B |  |  |  |
| Temperature | ° C. | 85 | 75 |
| Pressure | MPa | 15 | 16 |
| Split | % | 10 | 10 |
| C2/C2 + C3 | Mol/mol | 0.43 | 0.40 |
| H2/C2 | Mol/mol | 0.045 | 0.045 |
| C6/C6 + C3 | Mol/mol | 0.39 | 0 |

C3 = propylene; C2 = ethylene; C6 = 1-hexene

TABLE 2

|  |  | Example 1 | Comparative ex. 2 |
| --- | --- | --- | --- |
| Component A |  |  |  |
| 1-hexene | Wt. % | 2.2 | 1.6 |
| MFR | g/10 min | 1.51 | 0.93 |
| XS | % |  |  |
| Component B |  |  |  |
| % component B | % | 7.5 | 7.0 |
| Ethylene | Wt. % | 45 | 49 |
| 1-hexene | Wt. % | 2.2 | 0 |
| Total polymer MFR | g/10 min | 1.55 | 1.4 |

To the polymer produced in Example 1 and comparative example 2, the additives reported on Table 3 were added.

TABLE 3

|  | % wt |
| --- | --- |
| DSTDP | 0.33 |
| TALC | 1.0 |
| CA STEARATE-M | 0.05 |
| IRGAFOS 168 | 0.11 |
| IRGANOX 1010 | 0.22 |
| IRGANOX 1330 | 0.11 |

In Table 4, the mechanical properties of the polymer of example 1 are compared with the properties of the comparative example 1.

TABLE 4

|  |  | Example 1 | Comparative Ex 2 |
| --- | --- | --- | --- |
| Tensile modulus | MPa | 1130 | 1170 |
| Charpy Impact @ 23° C. 7 d | KJ/m² | 96.0 | 87.2 |
| Charpy Impact @ 0° C. 7 d | KJ/m² | 7.2 | 6.5 |
| Melting point | ° C. | 148.6 | 148.6 |

TABLE 5

|  | Comp ex 2 | | | | Example 1 | | | |
| --- | --- | --- | --- | --- | --- | --- | --- | --- |
| T ° C. | stress MPa | time 4% h | time 10% h | Time brk-yld h | stress MPa | time 4% h | time 10% h | Time brk-yld h |
| 23 | 20 | 0.018 | 0.18 | 0.32 | 20 | 0.014 | 0.25 | 0.47 |
| 23 | 16 | 0.335 | 5.4 | 8.9 | 16 | 0.447 | 10.4 | 25.1 |
| 70 | 8 | 0.004 | 0.079 | 0.22 | 8 | nm | nm | nm |
| 70 | 6 | 0.0067 | 0.29 | 1.5 | 6 | 0.038 | 23.6 | nm |
| 70 | 5 | 10 | nm | nm | 5 | 25.1 | nm | nm |

What is claimed is:

1. A polypropylene composition comprising:
    A) from 88.0 wt. % to 98.0 wt. %, of a random copolymer of propylene containing from 0.8 wt. % to 4.8 wt. % of 1-hexene derived units, based upon the total weight of the random copolymer of propylene, wherein the random copolymer of propylene has a melt flow rate, measured according to ISO 1133 (230° C., 5 kg) ranging from 0.5 to 4.4 g/10 min.; and
    B) from 2.0 wt. % to 12.0 wt. % of a terpolymer, wherein the terpolymer consists of propylene, ethylene and 1-hexene, and wherein the terpolymer has a content of ethylene derived units ranging from 35 wt. % to 60 wt.

%, based upon the total weight of the terpolymer, and a content of 1-hexene derived units ranging from 1 wt. % to 6 wt. %, based upon the total weight of the terpolymer, wherein the polypropylene composition has a melt flow rate, measured according to ISO 1133 (230° C., 5 kg) ranging from 0.5 to 5.0 g/10 min, and wherein the sum of the amounts of A) and B) is 100.

2. The polypropylene composition according to claim 1, wherein, in component A), the content of 1-hexene derived units ranges from 1.4 wt. % to 4.1 wt. %.

3. The polypropylene composition according to claim 1, wherein, in component A), the content of 1-hexene derived units ranges from 1.8 wt. % to 3.6 wt. %.

4. The polypropylene composition according to claim 1, wherein, in component B, the content of ethylene derived units ranges from 42 wt. % to 54 wt. %.

5. The polypropylene composition according to claim 1, wherein the amount of component A) ranges from 90.5 wt. % to 96.5 wt. % and the amount of component B ranges from 3.5 wt. % to 9.5 wt. %.

6. The polypropylene composition according to claim 1, having a tensile modulus higher than 900 MPa measured according to ISO 527-2 2012, and ISO 1873-2 2007.

7. The polypropylene composition according to claim 1, having a Charpy impact value measured according to ISO 179-1eA 2010, and ISO 1873-2 2007, measured at 23° C. after 7 days of annealing, higher than 80 KJ/m$^2$.

8. A pipe comprising the polypropylene composition of claim 1.

9. A pressure pipe comprising the polypropylene composition of claim 1.

* * * * *